US010599498B2

(12) United States Patent
Nakaike et al.

(10) Patent No.: US 10,599,498 B2
(45) Date of Patent: *Mar. 24, 2020

(54) AGGREGATING REQUESTS AMONG MICROSERVICES

(71) Applicant: INTERNATIONAL BUSINESS MACHINES CORPORATION, Armonk, NY (US)

(72) Inventors: Takuya Nakaike, Tokyo (JP); Moriyoshi Ohara, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/812,715

(22) Filed: Nov. 14, 2017

(65) Prior Publication Data

US 2018/0365088 A1    Dec. 20, 2018

Related U.S. Application Data

(63) Continuation of application No. 15/624,173, filed on Jun. 15, 2017.

(51) Int. Cl.
*H04L 29/02* (2006.01)
*G06F 9/54* (2006.01)

(52) U.S. Cl.
CPC .............. *G06F 9/547* (2013.01); *G06F 9/541* (2013.01)

(58) Field of Classification Search
CPC ...................................................... G06F 9/547
See application file for complete search history.

(56) References Cited

U.S. PATENT DOCUMENTS

2015/0161681 A1   6/2015  Maes et al.
2016/0124742 A1*  5/2016  Rangasamy ............ H04L 47/70
                                                717/103

(Continued)

FOREIGN PATENT DOCUMENTS

CN           105577780         5/2016

(Continued)

OTHER PUBLICATIONS

Michael Hofmann et al. "Microservices Best Practices for Java", First Edition (Dec. 2016) (Year: 2016).*

(Continued)

*Primary Examiner* — Andy Ho
*Assistant Examiner* — Abdou K Seye
(74) *Attorney, Agent, or Firm* — Tutunjian & Bitetto, P.C.; Vazken Alexanian

(57) ABSTRACT

A computer-implemented method is provided for processing requests among microservices in a computer network. The method includes generating, by a processor, a method to return a body of a response from an Application Programming Interface (API) that aggregates the requests among the microservices to form aggregated requests. The method further includes generating, by the processor, another API that automatically receives the aggregated requests from the API by receiving an array of parameters of the original API and calling the method using each of the parameters of the array as a call parameter for the method. The method also includes optimizing, by the processor, a number of aggregated requests in a network layer of the computer network based on a wait time and a response time to receive and transfer requests between micro services.

3 Claims, 11 Drawing Sheets

(56) References Cited

U.S. PATENT DOCUMENTS

| | | |
|---|---|---|
| 2016/0248861 A1 | 8/2016 | Lawson et al. |
| 2018/0032534 A1* | 2/2018 | Koerner .............. G06F 16/2471 |
| 2018/0069806 A1* | 3/2018 | Kumar .................. H04L 47/782 |
| 2018/0077138 A1* | 3/2018 | Bansal .................. H04L 63/108 |

OTHER PUBLICATIONS

List of IBM Patents or Patent Applications Treated as Related dated Nov. 14, 2017, 2 pages.

Richardson, C., "Building Microservices: Using an API Gateway", Blog Tech, Jun. 2015, 11 pages.

Das, et al., "Adaptive Stream Processing using Dynamic Batch Sizing", Electrical Engineering and Computer Sciences University of California at Berkeley, Technical Report No. UCB/EECS-2014-133, Jun. 2014, 32 pages.

Didona, et al., "An Extremum Seeking Algorithm for Message Batching in Total Order Protocols", 2012 IEEE Sixth International Conference on Self-Adaptive and Self-Organizing Systems, Sep. 2012, pp. 89-98.

Friedman, et al., "Adaptive Batching for Replicated Servers", 25th IEEE Symposium on Reliable Distributed Systems (SRDS'06). Oct. 2006, 10 pages.

Ohara, M., "Aggregating Rest requests to accelerate Web 2.0 applications", IBM J. Res. & Dev. Paper 8, Jan. 2010, 12 pages vol. 54 No. 1.

\* cited by examiner

```
@GET
@Path("/{user}/{password}")
@Produces("application/json")
public Response validateSession(@PathParam("user") String user,
                @PathParam("password") String password) {
    return Response.ok(customerService.validateSession(user, password).toString()).build();
}
```

```
public String _validateSession(String user,
                String password) {
    return customerService.validateSession(user, password).toString();
}
```

```
@GET
@Path("/{users}/{passwords}")
@Produces("application/json")
public Response aggValidateSession(@PathParam("users") String users,
                                    @PathParam("passwords") String passwords) {

String[] userArray = users.split(",");
    String[] passwordArray = passwords.split(",");
    String res = null;
    for (int i = 0; i < users.length; i++) {
        res += (_validateSession(userArray[i], passwordArray[i]) + ",");
    }
    return Response.ok(res.toString()).build();
}
```

```
public String[] doServiceCall (String[] users, String[] passwords) {
  String url = "http://hoge.com:9080/";
  for (int i = 0; i < users.length; i++) {
    url += (users[i] + ",");
  }
  url += "/";
  for (int i = 0; i < passwords.length; i++) {
    url += (passwords[i] + ",");
  }
  HttpURLConnection urlc = (HttpURLConnection) new URL(url).openConnection();
  BufferedReader br = new BufferedReader(new InputStreamReader(urlc.getInputStream()));
  StringBuilder sb = new StringBuilder();
  String l = null;
  while ((l=br.readLine())!=null) {
    sb=sb.append(l);
  }
  br.close();
  String[] res = sb.toString().split(",");
  return res;
}
```

1000

AGGREGATING REQUESTS AMONG MICROSERVICES

BACKGROUND

Technical Field

The present invention relates generally to information processing and, in particular, to a hardware-assisted approach for local triangle counting in massive graphs.

Description of the Related Art

Recently, microservice architectures are becoming popular for agile software development. The microservice architecture allows each service to be developed independently by constructing an application as a set of services which are loosely connected through REpresentational State Transfer (REST) Application Programming Interfaces (APIs).

However, a problem with microservice architectures is that they can have large overhead for communications among the involved services. For example, when a monolithic application is translated into a microservice application, the throughput was reduced to one third and the response time was increased five times. The major cause of the performance degradation is the overhead to get and process requests.

Thus, there is a need for a way to reduce the communication overhead associated with microservice architectures.

SUMMARY

According to an aspect of the present invention, a computer-implemented method is provided for processing requests among microservices in a computer network. The method includes generating, by a processor, a method to return a body of a response from an Application Programming Interface (API) that aggregates the requests among the microservices to form aggregated requests. The method further includes generating, by the processor, another API that automatically receives the aggregated requests from the API by receiving an array of parameters of the original API and calling the method using each of the parameters of the array as a call parameter for the method. The method also includes optimizing, by the processor, a number of aggregated requests in a network layer of the computer network based on a wait time and a response time to receive and transfer requests between micro services.

According to another aspect of the present invention, a computer program product is provided for processing requests among microservices in a computer network. The computer program product includes a non-transitory computer readable storage medium having program instructions embodied therewith. The program instructions are executable by a computer to cause the computer to perform a method. The method includes generating, by a processor, a method to return a body of a response from an Application Programming Interface (API) that aggregates the requests among the microservices to form aggregated requests. The method further includes generating, by the processor, another API that automatically receives the aggregated requests from the API by receiving an array of parameters of the original API and calling the method using each of the parameters of the array as a call parameter for the method. The method also includes optimizing, by the processor, a number of aggregated requests in a network layer of the computer network based on a wait time and a response time to receive and transfer requests between micro services.

According to yet another aspect of the present invention, a computer processing system is provided for processing requests among microservices in a computer network. The system includes a processor and a memory operably coupled to the processor. The processor and the memory are configured to generate a method to return a body of a response from an Application Programming Interface (API) that aggregates the requests among the microservices to form aggregated requests. The processor and the memory are further configured to generate another API that automatically receives the aggregated requests from the API by receiving an array of parameters of the original API and calling the method using each of the parameters of the array as a call parameter for the method. The processor and the memory are also configured to optimize a number of aggregated requests in a network layer of the computer network based on a wait time and a response time to receive and transfer requests between micro services.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 4 shows an exemplary original REST API to which the present invention can be applied, in accordance with an embodiment of the present invention;

FIG. 5 shows an exemplary alternate method (REST API alternate method) for the original REST API of FIG. 4, in accordance with an embodiment of the present invention;

FIG. 6 shows an exemplary new REST API, in accordance with an embodiment of the present invention;

FIG. 10 shows an exemplary aggregation of requests among microservices, in accordance with an embodiment of the present invention;

DETAILED DESCRIPTION

The present invention is directed to aggregating requests among microservices.

In an embodiment, the present invention improves the performance of microservice applications by aggregating requests among the microservices. To that end, in an embodiment, a new REST API is generated that receives the aggregated requests automatically from an original REST API. In an embodiment, the number of aggregated requests can be optimized as follows: (i) If a wait time for requests to be aggregated is too long, the total response time can increase; and (ii) If a wait time for requests to be aggregated is too short, the total response time cannot decrease.

Figure 1:
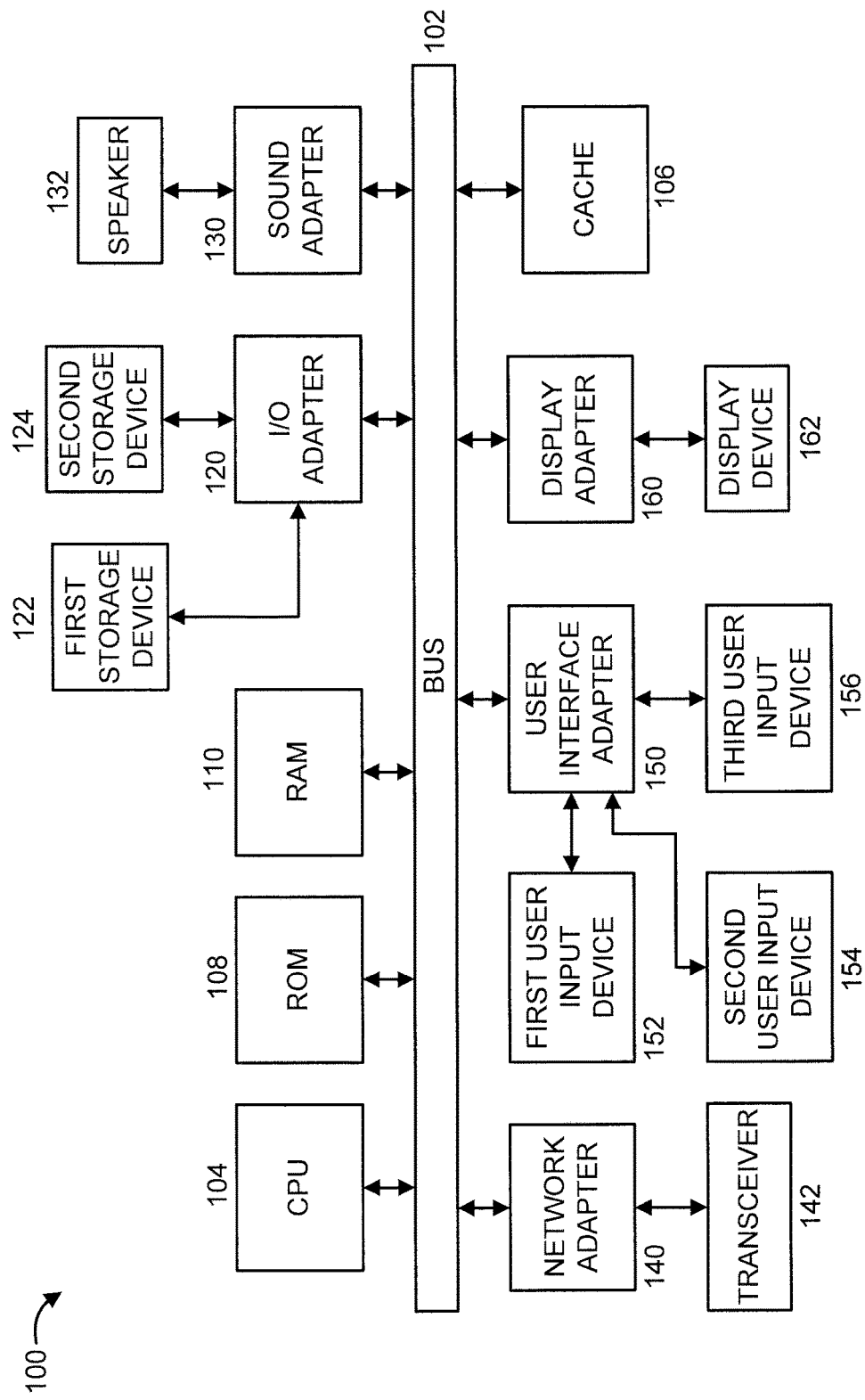
FIG. 1 shows an exemplary processing system to which the invention principles may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
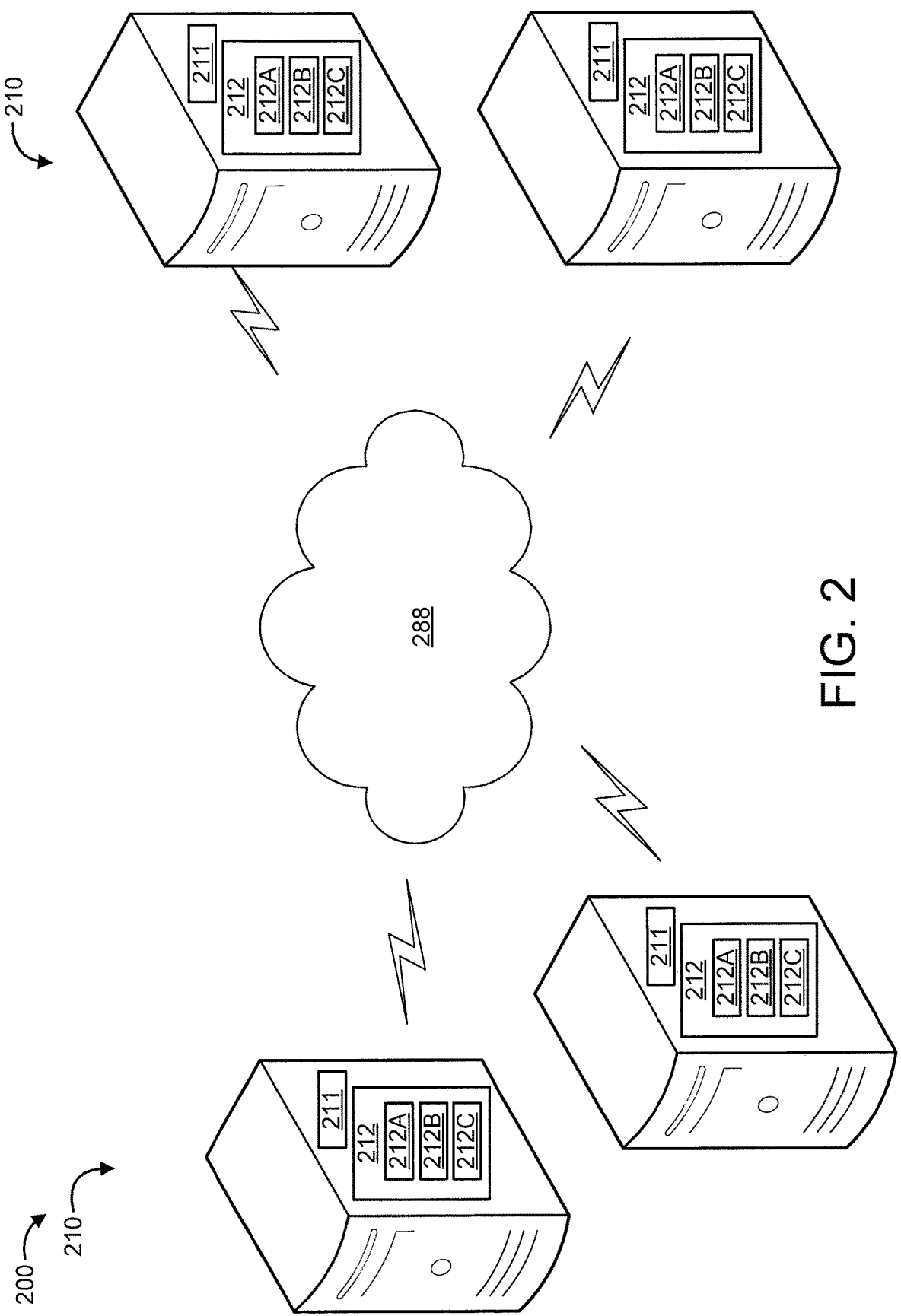
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 9:
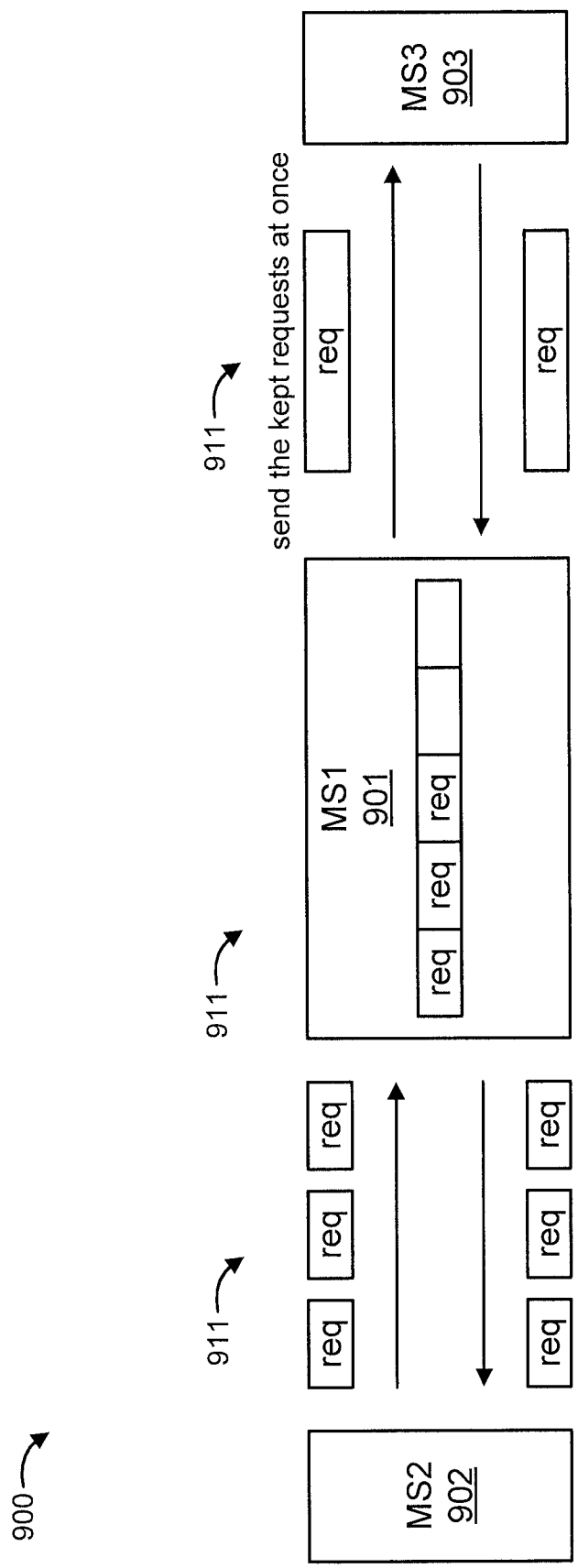
FIG. 9 shows an exemplary environment to which the present invention can be applied, in accordance with an embodiment of the present invention.

Also, it is to be appreciated that environment 900 described below with respect to FIG. 9 is an environment for implementing respective embodiments of the present invention. Part or all of processing system 100 may be implemented in one or more of the elements of environment 900.

Figure 3:
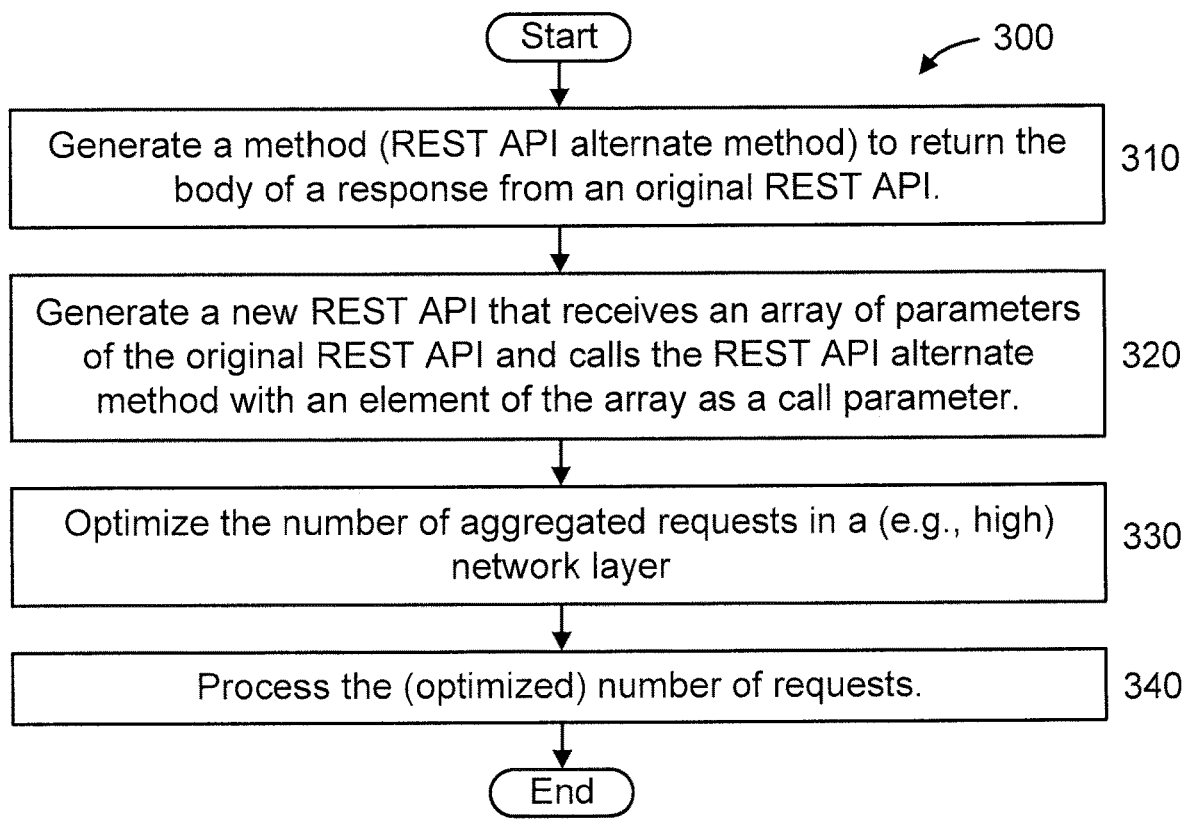
FIG. 3 shows an exemplary method for aggregating requests among microservices, in accordance with an embodiment of the present invention.
Figure 7:
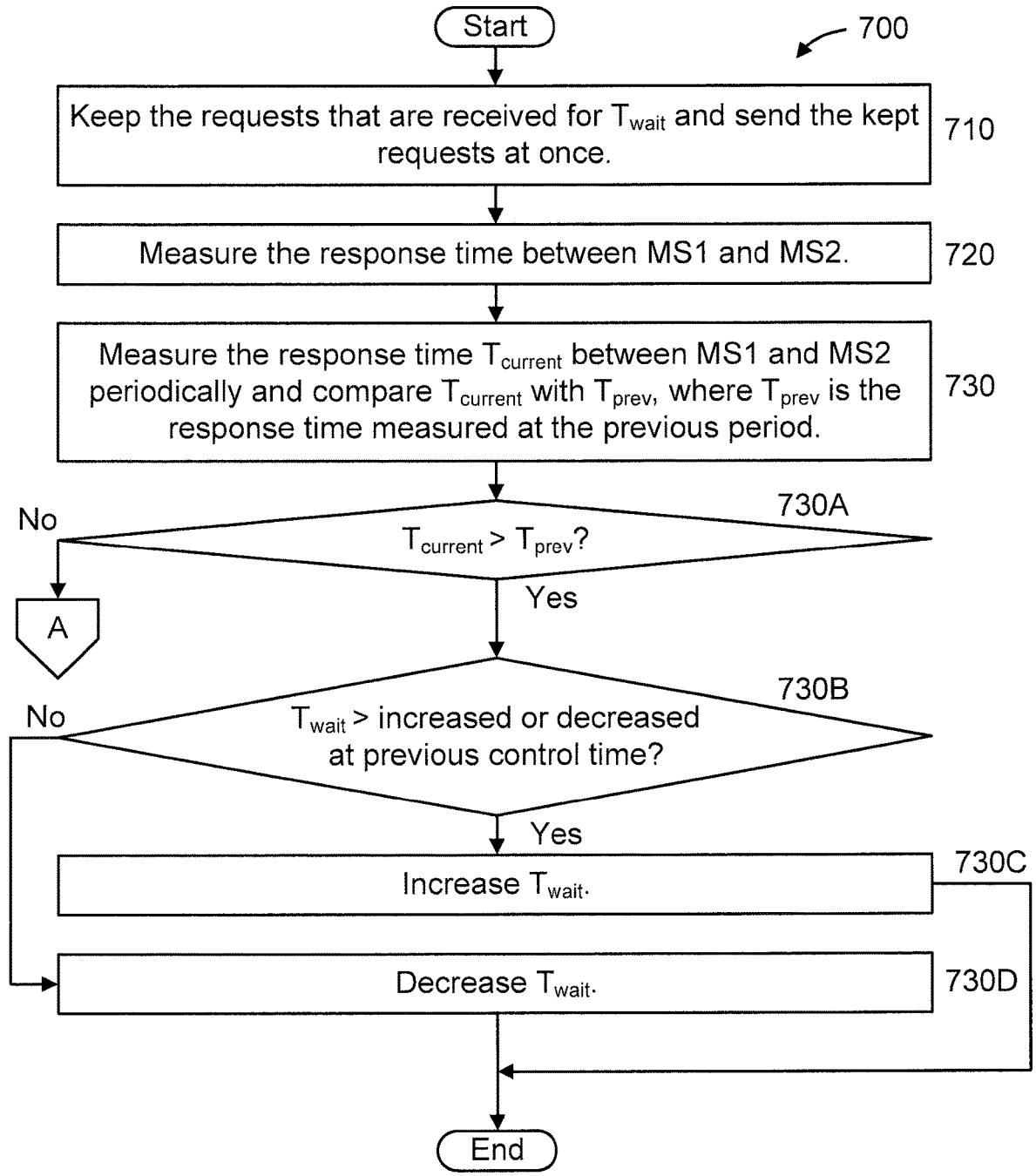
FIGS. 7-8 show an exemplary method for optimizing the number of aggregated requested among microservices, in accordance with an embodiment of the present invention.
Figure 8:
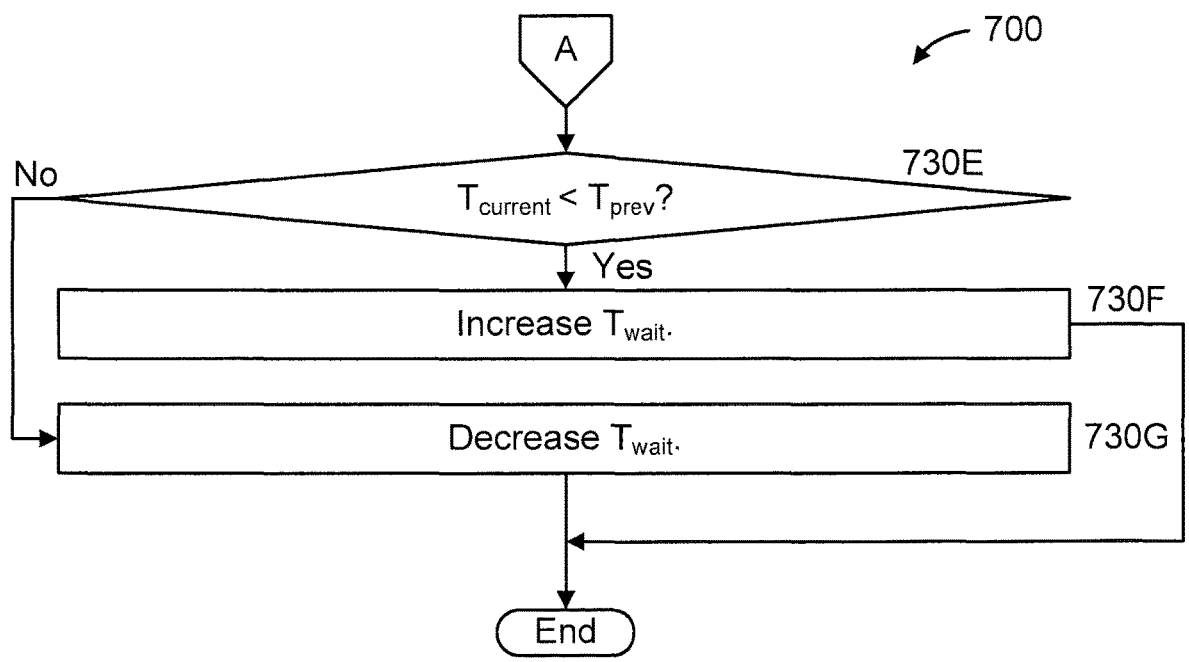

Further, it is to be appreciated that processing system 100 may perform at least part of the methods described herein including, for example, at least part of method 300 of FIG. 3 and/or at least part of method 700 of FIGS. 7-8. Similarly, part or all of environment 200 may be used to perform at least part of method 300 of FIG. 3 and/or at least part of method 700 of FIGS. 7-8. Also, part or all of environment 900 may be used to perform at least part of method 300 of FIG. 3 and/or at least part of method 700 of FIGS. 7-8.

FIG. 2 shows an exemplary environment 200 to which the present invention can be applied, in accordance with an embodiment of the present invention.

The environment 200 includes a set of nodes, collectively and individually denoted by the figure reference numeral 210. In an embodiment, the set of nodes 210 are part of a distributed data processing system.

Each of the nodes 210 include one or more microservices 211. Each of the microservices 211 includes a respective set of services which are loosely coupled through one or more REpresentational State Transfer (REST) Application Programming Interfaces (APIs).

Each of the nodes 210 includes a microservice request aggregator 212. The microservice request aggregator 212 aggregates microservice requests and optimizes the number of aggregated microservice requests to minimize system response time. To those ends, each of the microservice request aggregators 212 includes a set of APIs 212A. In an embodiment, each of the microservice request aggregators 212 further at least includes and/or otherwise uses a processor 212B and a memory 212C.

In the embodiment shown in FIG. 2, the elements thereof are interconnected wirelessly through one or more networks (denoted by the figure reference numeral 288). However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary method 300 for aggregating requests among microservices, in accordance with an embodiment of the present invention.

At step 310, generate a method (REST API alternate method) to return the body of a response (e.g., a character string) from an original REST API. FIG. 4 shows an exemplary original REST API 400 to which the present invention can be applied, in accordance with an embodiment of the present invention. FIG. 5 shows an exemplary alternate method (REST API alternate method) 500 for the original REST API 400 of FIG. 4, in accordance with an embodiment of the present invention. Thus, in an embodiment, original REST API 400 can serve as input to step 310, where REST API alternate method 500 can serve as the output from step 310.

At step 320, generate a new REST API that receives an array of parameters of the original REST API and calls the REST API alternate method with an element of the array as a call parameter. FIG. 6 shows an exemplary new REST API 600, in accordance with an embodiment of the present invention. Thus, new RES API 600 can serve as an output from step 320.

At step 330, optimize the number of aggregated requests in a network layer. In an embodiment, a high network layer (e.g., the Hypertext Transfer Protocol (HTTP) layer) is used. As known relative to the Open Systems Interconnection (OSI) network model, a high layer can refer to the application layer (which can use HTTP). In an embodiment, the number of aggregated request is optimized by performing the method 700 of FIG. 7.

At step 340, process the (optimized) number of requests. In this way, a response time of the requests is minimized.

FIGS. 7-8 show an exemplary method 700 for optimizing the number of aggregated requested among microservices, in accordance with an embodiment of the present invention. FIG. 9 shows an exemplary environment 900 to which the present invention can be applied, in accordance with an embodiment of the present invention. Method 700, for example, can be applied to environment 900, in accordance with an embodiment of the present invention. The environment 900 involves a first microservice (MS1) 901, a second microservice (MS2) 902, a third microservice (MS3) 903, and multiple requests (abbreviated as "req") 911.

Regarding FIGS. 7-9, when microservice (MS1) 901 receives a requests from microservice 2 (MS2) 902 and sends a request to microservice 3 (MS3) 903, the present invention controls $T_{wait}$ dynamically based on $T_{response}$ and aggregates any of the requests 911 that received within $T_{wait}$.

Further regarding FIGS. 7-9, the following definitions apply:

$T_{wait}$: The wait time between when microservice 1 (MS1) 901 receives a request from microservice 2 (MS2) 902 and microservice 1 (MS1) 901 sends a requests to microservice 3 (MS3) 903.

$T_{response}$: The average response time between when microservice 1 (MS1) 901 receives a request from microservice 2 (MS2) 902 and microservice 1 (MS1) 901 returns a response to microservice 2 (MS2) 902.

At step 710, keep the requests that are received for $T_{wait}$ and send the kept requests at once.

At step 720, measure the response time between MS1 901 and MS2 902. In an embodiment, consider the total overhead to wait requests and aggregate the requests by using the response time between MS1 and MS2 instead of the response time between MS1 and MS3.

At step 730, measure the response time $T_{current}$ between MS1 901 and MS2 902 periodically and compare $T_{current}$ with $T_{prev}$, where $T_{prev}$ is the response time measured at the previous period.

In an embodiment, step 730 includes step 730A through 730TBD.

At step 730A, determine whether $T_{current} > T_{prev}$. If so, then proceed to step 730B. Otherwise, proceed to step 730E.

At step 730B, determine whether $T_{wait}$ was increased or decreased at the previous control time. If $T_{wait}$ was increased at the previous control time, then proceed to step 730C. Otherwise (if $T_{wait}$ was decreased at the previous control time), proceed to step 730D.

At step 730C, increase $T_{wait}$.

At step 730D, decrease $T_{wait}$.

At step 730E, determine whether $T_{current} < T_{prev}$. If so, then proceed to step 730F. Otherwise, proceed to step 730G.

At step 730F, determine whether $T_{wait}$ was increased or decreased at the previous control time. If $T_{wait}$ was increased at the previous control time, then proceed to step 730G. Otherwise (if $T_{wait}$ was decreased at the previous control time), proceed to step 730H.

At step 730G, increase $T_{wait}$.

At step 730H, decrease $T_{wait}$.

FIG. 10 shows an exemplary aggregation 1000 of requests among microservices, in accordance with an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
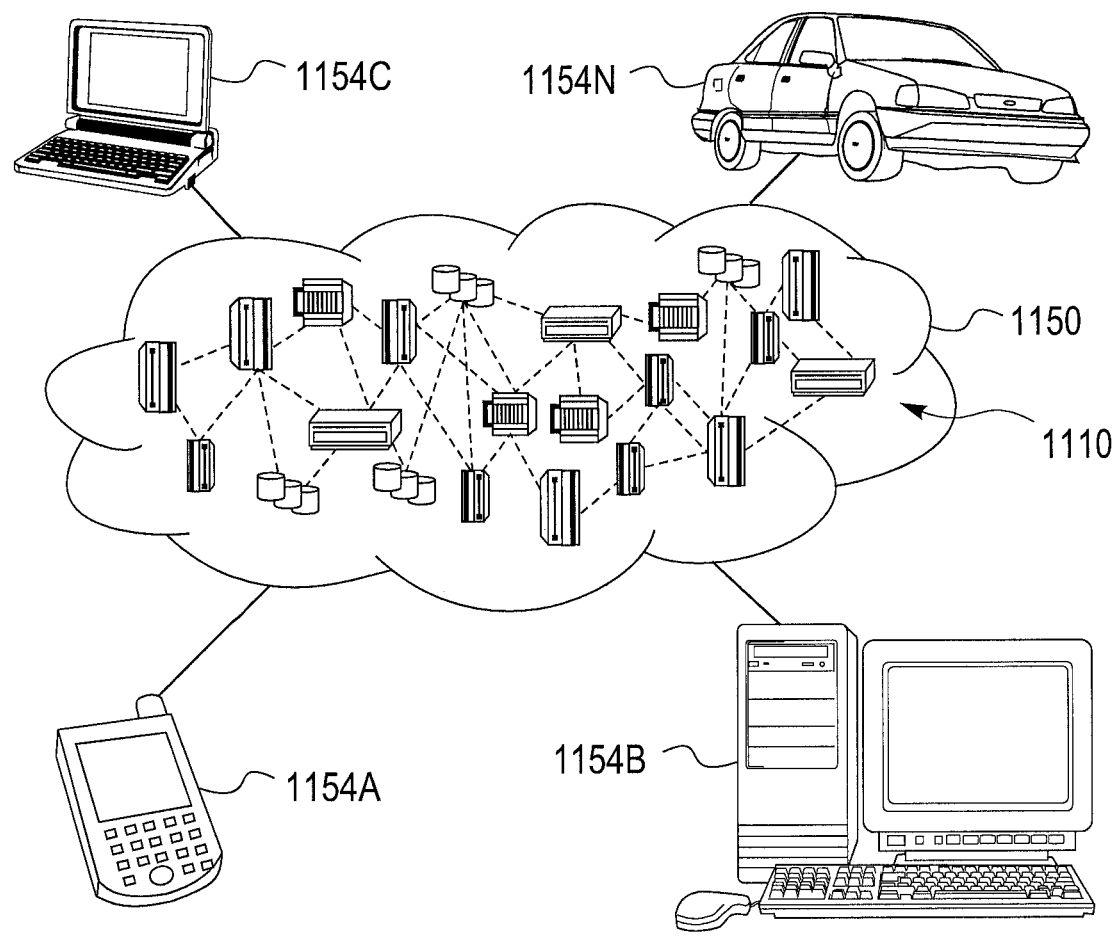
FIG. 11 shows an exemplary cloud computing environment, in accordance with an embodiment of the present invention.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
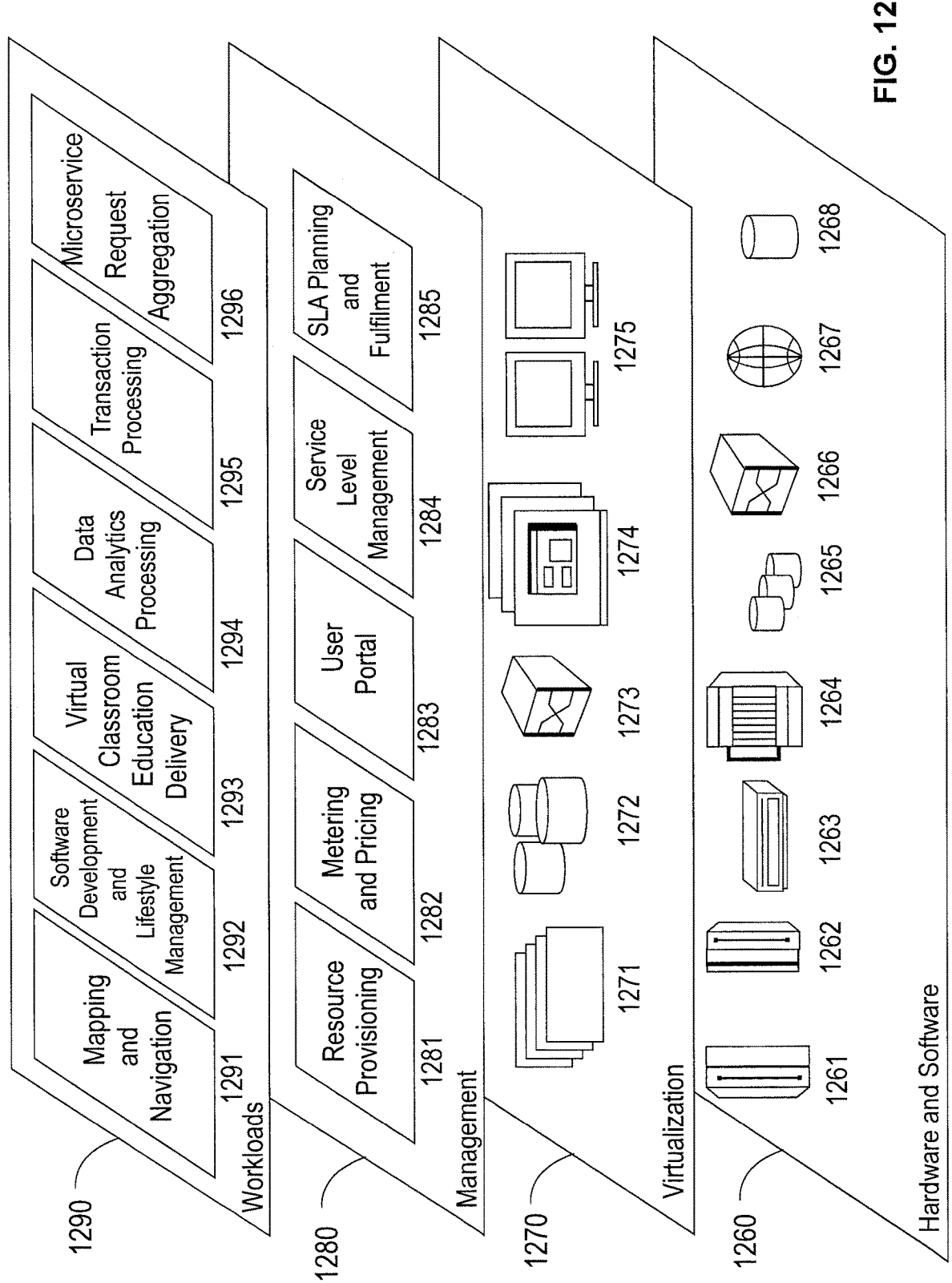
FIG. 12 shows exemplary abstraction model layers, in accordance with an embodiment of the present invention.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and microservice request aggregation 1296.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for processing requests among microservices in a computer network, the computer program product comprising a non-transitory computer readable storage medium having program instructions embodied therewith, the program instructions executable by a computer to cause the computer to perform a method comprising:
   generating, by a processor, a method to return a body of a response from an Application Programming Interface (API) that aggregates the requests among the microservices to form aggregated requests;
   generating, by the processor, another API that automatically receives the aggregated requests from the API by receiving an array of parameters of the original API and calling the method to return the body of the response using each of the parameters of the array as a call parameter for the method; and
   optimizing, by the processor, a number of aggregated requests in a network layer of the computer network based on a wait time and a response time to receive and transfer requests between micro services,
   wherein the microservices comprise a first, a second, and a third microservice, wherein the wait time is a time period between when the first microservice receives one of the requests from the second microservice and sends another one of the requests to the third microservice, wherein the method further includes adjusting the wait time based on a comparison of a current response time between the first and the second microservice to a previous response time between the first and the second microservices, and wherein the wait time is increased responsive to the current response time being greater than the previous response time and the wait time being decreased at a previous control time.

2. The computer program product of claim 1, wherein any of the requests received within the wait time are aggregated to form the aggregated requested.

3. A computer processing system for processing requests among microservices in a computer network, comprising:
   a processor and a memory operably coupled to the processor, configured to:
      generate a method to return a body of a response from an Application Programming Interface (API) that aggregates the requests among the microservices to form aggregated requests;
      generate another API that automatically receives the aggregated requests from the API by receiving an array of parameters of the original API and calling the method using each of the parameters of the array as a call parameter for the method; and
      optimize a number of aggregated requests in a network layer of the computer network based on a wait time and a response time to receive and transfer requests between micro services,
   wherein the microservices comprise a first, a second, and a third microservice, wherein the wait time is a time period between when the first microservice receives one of the requests from the second microservice and sends another one of the requests to the third microservice, wherein the method further includes adjusting the wait time based on a comparison of a current response time between the first and the second microservice to a previous response time between the first and the second microservices, and wherein the wait time is increased responsive to the current response time being greater than the previous response time and the wait time being decreased at a previous control time.

* * * * *